United States Patent
Liu et al.

(10) Patent No.: US 9,148,622 B2
(45) Date of Patent: Sep. 29, 2015

(54) HALO REDUCTION IN FRAME-RATE-CONVERSION USING HYBRID BI-DIRECTIONAL MOTION VECTORS FOR OCCLUSION/DISOCCLUSION DETECTION

(75) Inventors: Xuejiao Liu, Guangdong (CN); King Hung Chiu, Hong Kong (HK); Peng Luo, Guangdong (CN); Tim Ka Lung Wong, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 926 days.

(21) Appl. No.: 13/339,690

(22) Filed: Dec. 29, 2011

(65) Prior Publication Data
US 2013/0170551 A1 Jul. 4, 2013

(51) Int. Cl.
| H04N 7/12 | (2006.01) |
| H04N 7/01 | (2006.01) |
| H04N 19/61 | (2014.01) |
| H04N 19/176 | (2014.01) |
| H04N 19/51 | (2014.01) |
| H04N 5/14 | (2006.01) |

(52) U.S. Cl.
CPC .............. *H04N 7/014* (2013.01); *H04N 5/145* (2013.01); *H04N 7/26244* (2013.01); *H04N 7/462* (2013.01); *H04N 7/50* (2013.01); *H04N 5/144* (2013.01); *H04N 7/361* (2013.01)

(58) Field of Classification Search
CPC ..... H04N 7/50; H04N 7/26244; H04N 7/462; H04N 5/145; H04N 7/361
See application file for complete search history.

(56) References Cited

U.S. PATENT DOCUMENTS 5,822,007 A * 10/1998 Knee et al. .................. 348/416.1
6,025,879 A * 2/2000 Yoneyama et al. ...... 375/240.24
(Continued)

FOREIGN PATENT DOCUMENTS

EP 2383992 A2 * 11/2011 ............... H04N 7/01

OTHER PUBLICATIONS

Song, H., et al., "A method for halo artifact reduction in MEMC", IEEE Consumer Electronics, 2009. ICCE'09, P-1-31, 2 pages.
(Continued)

*Primary Examiner* — Shawn An
(74) *Attorney, Agent, or Firm* — Stuart T. Auvinen; g Patent LLC

(57) ABSTRACT

A frame-rate converter reduces halo artifacts along edges of moving objects. Halo artifacts occur on interpolated frames where a moving object covers and uncovers pixels along its edges. Motion estimation among three original frames produces hybrid direction motion vectors that are bi-directional for background and objects, but are unidirectional for covered and uncovered regions, since motion vectors with large matching errors are deleted. Covered regions in the interpolated frame are detected as intersecting only a forward but no backward hybrid motion vector. Bi-directional motion estimation from the hybrid motion vectors of two original frames produces refined motion vectors for the interpolated frame. Refined motion vectors in the covered regions are deleted and replaced with hybrid motion vectors from the original frames. Hybrid motion vectors from the original frames are assigned to the critical covered regions rather than using interpolated vectors in the covered regions, reducing halo artifacts.

22 Claims, 11 Drawing Sheets

(56) References Cited

U.S. PATENT DOCUMENTS

| | | | |
|---|---|---|---|
| 6,219,436 B1* | 4/2001 | De Haan et al. | 382/107 |
| 7,536,031 B2 | 5/2009 | Wittebrood | |
| 2005/0013498 A1* | 1/2005 | Srinivasan et al. | 382/239 |
| 2010/0045856 A1* | 2/2010 | Chappalli et al. | 348/441 |

OTHER PUBLICATIONS

Choi et al., "New'Frame Rate Up-conversion Using Bi-directional Motion Estimation", IEEE Transactions on Consumer Electronics, vol. 46, No. 3, Aug. 2000, pp. 603-609.

* cited by examiner

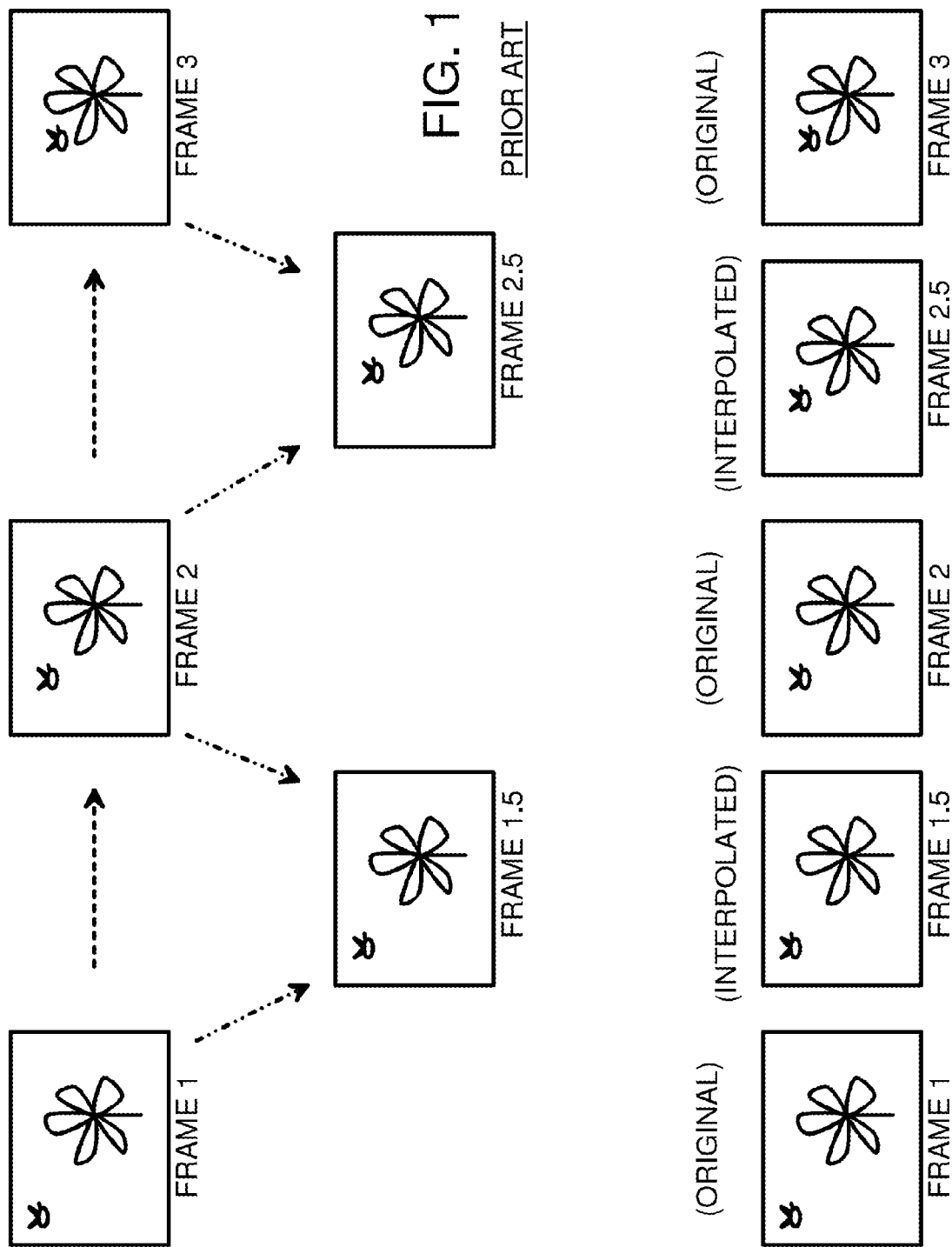

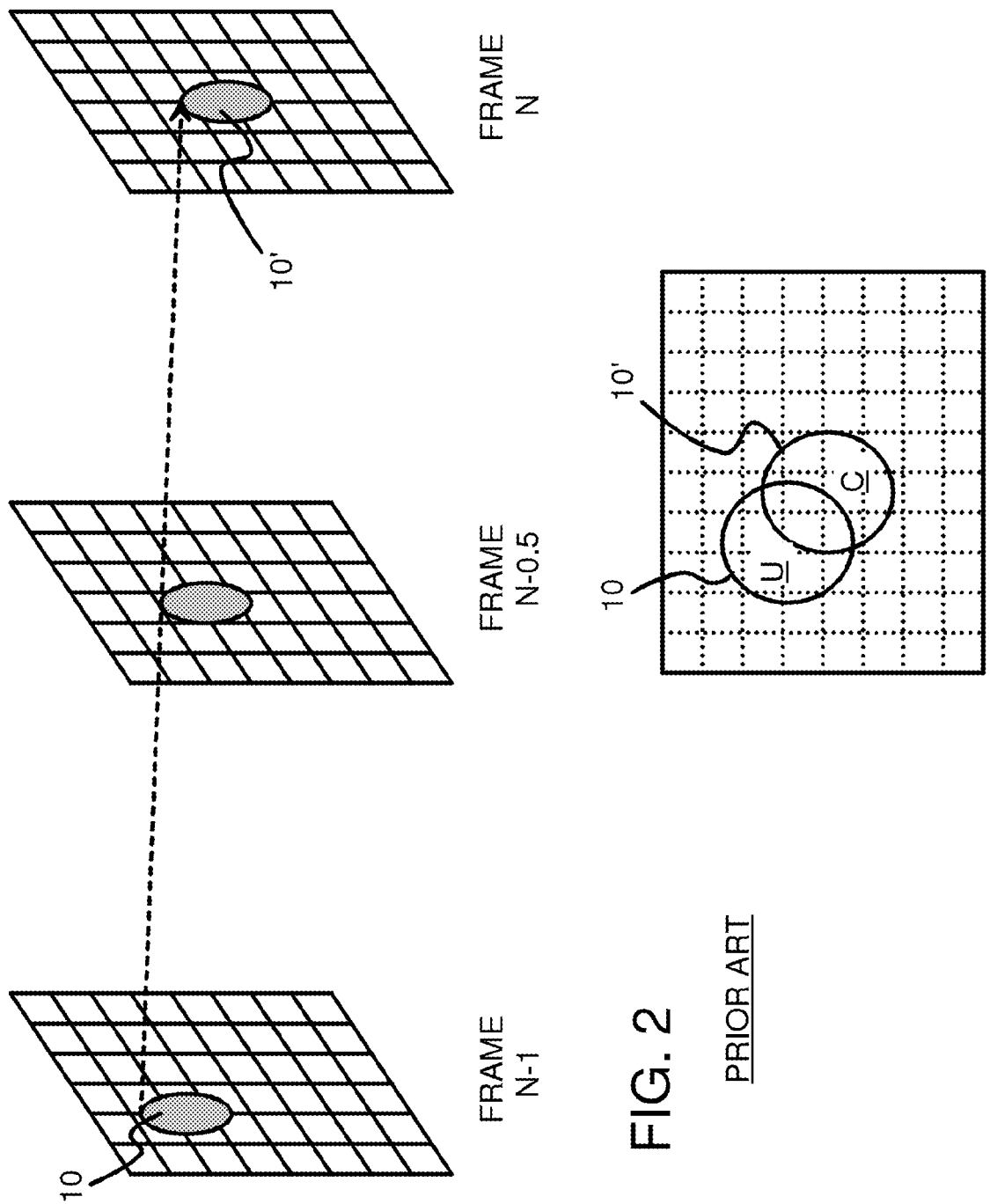

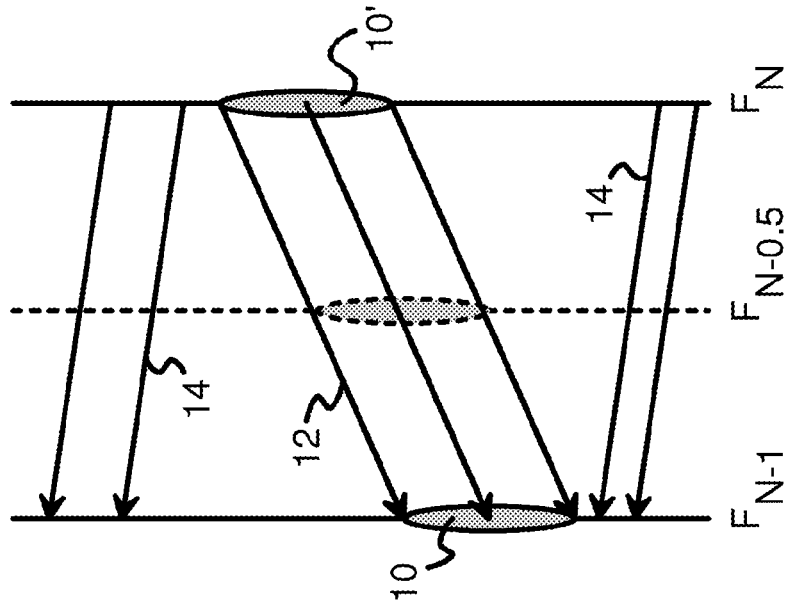
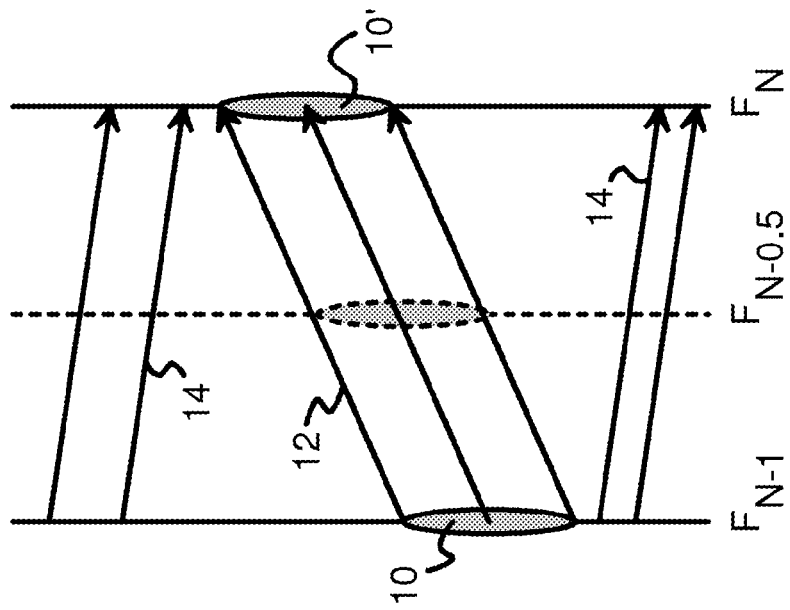
FIG. 3A
FIG. 3B
PRIOR ART

HALO REDUCTION IN FRAME-RATE-CONVERSION USING HYBRID BI-DIRECTIONAL MOTION VECTORS FOR OCCLUSION/DISOCCLUSION DETECTION

FIELD OF THE INVENTION

This invention relates to video processing, and more particularly to motion-compensated frame-rate-conversion with occlusion resolution.

BACKGROUND OF THE INVENTION

The image quality of flat-panel televisions and other displays has improved in part due to higher refresh or frame rates. While film and video standards such as NTSC and PAL have fixed frame rates, up-converters in modern TV's and displays allows a higher frame rate to be displayed to the viewer. Higher frame rates have less time between adjacent frames, allowing for smaller movement of display objects between frames. Moreover, the LCD display hold time of each frame is reduced at higher frame rates. As a result, the after-image and thus the perceived motion blur is reduced. Motion appears smoother and less jerky with higher frame rates. Newer technologies such as 3D TV's require higher frame rates so that slightly different images can be displayed to each eye using active shutter glasses. In 3D TV's with active shutter glasses, left eye views and right eye views are displayed alternately. So the actual frame rate received by the viewer is reduced by half. Frame rate up-conversion is used to maintain the frame rate for each eye so as to keep motion as smooth as in 2D videos.

While frames could simply be replicated to increase the frame rate, modern graphics processors may create new frames between existing frames. The new frames may be interpolated from the two surrounding original frames. Each frame can be divided into MacroBlocks (MB's) and then generating Motion Vectors (MV's) for each MB. Each MB is then translated along the MV to construct the interpolated frame between the two original frames.

FIG. 1 shows frame interpolation for Frame-Rate Conversion (FRC). Frames 1, 2, 3 are original frames in an original video sequence having a lower frame frequency. Interpolated frame 1.5 is created from frames 1 and 2 by translating MB's from either frame 1 or frame 2 along MV's. Likewise, interpolated frame 2.5 is created from original frames 2 and 3 by macroblocks being translated along motion vectors. The translated distance to frame 2.5 may be half of the translation distance between frames 2 and 3 for each motion vector.

The final sequence of frames produced by interpolation has double the number of frames, with one interpolated frame inserted after each original frame.

Some foreground objects may be moving faster than the background, such as the honeybee moving toward the flower in the sequence shown in FIG. 1. These foreground objects (objects) have larger motion vectors relative to the motion vectors for background objects (background).

FIG. 2 highlights an object moving relative to a background, occluding covered regions. Object 10 in frame N−1 is in motion relative to the background, shown as a grid. Object 10 from frame N−1 moves to the location of object 10' in frame N. Object 10 is translated along a motion vector to find the location of object 10 in interpolated frame N−0.5.

The location of object 10 moves lower and to the right for object 10', as seen when frames N−1 and N are stacked on top of each other as shown in the bottom of FIG. 2. The apparent motion of object 10 creates an uncovered region U, and a covered region C. The uncovered region U is a portion of the background image that was hidden by object 10 in frame N−1 becomes visible in frame N. Likewise, covered region C is a portion of the background image that was visible in frame N−1 but becomes hidden by object 10' in frame N.

Such covering and uncovering, or occlusion and disocclusion, by object 10 complicates frame interpolation.

FIG. 3 highlights missing motion vectors for covered and uncovered regions. The frames are shown edge-on in FIGS. 3A-B. In FIG. 3A, forward motion vectors 14 point to the locations where macroblocks from frame FN−1 appear in next original frame FN. Object motion vectors 12 for object 10 point to the new location for object 10' in frame FN. The location of object 10 in interpolated frame FN−0.5 can be determined by translation of macroblocks in object 10 by half of the distance of object motion vectors 12, just as macroblocks for the background image can be located at half the distance of motion vectors 14.

However, object 10 is moving relative to the background. The apparent motion of object 10 causes some of the macroblocks in frame Fn to have no valid motion vector 14. For example, macroblocks just above object 10 in frame FN−1 are covered by object 10' in frame FN, so these macroblocks have no matching macroblocks in frame FN.

In FIG. 3B, backwards motion vectors 14 point to the locations where macroblocks from frame FN appear in next original frame FN−1. Object motion vectors 12 for object 10' point to the prior location for object 10 in frame FN−1. The location of object 10 in interpolated frame FN−0.5 can be determined by backward translation of macroblocks in object 10' by half of the distance of object motion vectors 12, just as macroblocks for the background image can be located at half the distance of motion vectors 14.

Using backwards motion vectors also results in some of the macroblocks in frame FN to have no valid motion vector 14. For example, macroblocks just below object 10' in frame FN were uncovered by the apparent movement of object 10 to frame FN, so these macroblocks have no matching macroblocks in frame FN−1.

Occlusion and disocclusion may cause problems for frame-rate converters. Since there are no valid motion vectors for covered or uncovered regions, simple motion estimation and macroblock translation breaks down along the edges of moving objects. The edges of objects can appear jumpy rather than move smoothly. Visible artifacts may be created by the frame rater converter when occlusion processes fail. For example, visible artifacts may take the form of a halo around the edges of a moving person's head. Thus these kinds of visible artifacts are sometimes known as halo effects, although they can occur along the edges of any moving object.

Various methods have been used to reduce such halo effects. Sometimes these methods are effective for some objects. but some combinations of objects and backgrounds can cause these methods to fail. For example, when the background is itself complex and changing, the methods may make incorrect assignments, causing some macroblocks from background objects to be placed over foreground objects. Ragged edges or blocky artifacts may also result from incorrect identification of covered and uncovered regions.

Some methods fail when the background is featureless. Detection may fail on object boundaries, resulting in ragged edges. The motion vectors may be inaccurate near covered regions, or may be incorrectly assigned, resulting in further visible artifacts. Computational load may be excessive for these methods of halo reduction.

What is desired is a frame-rate converter that generates interpolated frames with fewer visible artifacts. It is desired to generate macroblocks for interpolated frames in covered and uncovered regions even when motion vectors in both directions are not valid. Reduction of halo effects along the edges of moving objects is desirable.

BRIEF DESCRIPTION OF THE DRAWINGS

FIG. 1 shows frame interpolation for Frame-Rate Conversion (FRC).

FIG. 2 highlights an object moving relative to a background, occluding covered regions.

FIG. 3 highlights missing motion vectors for covered and uncovered regions.

DETAILED DESCRIPTION

The present invention relates to an improvement in halo reduction for frame rate converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
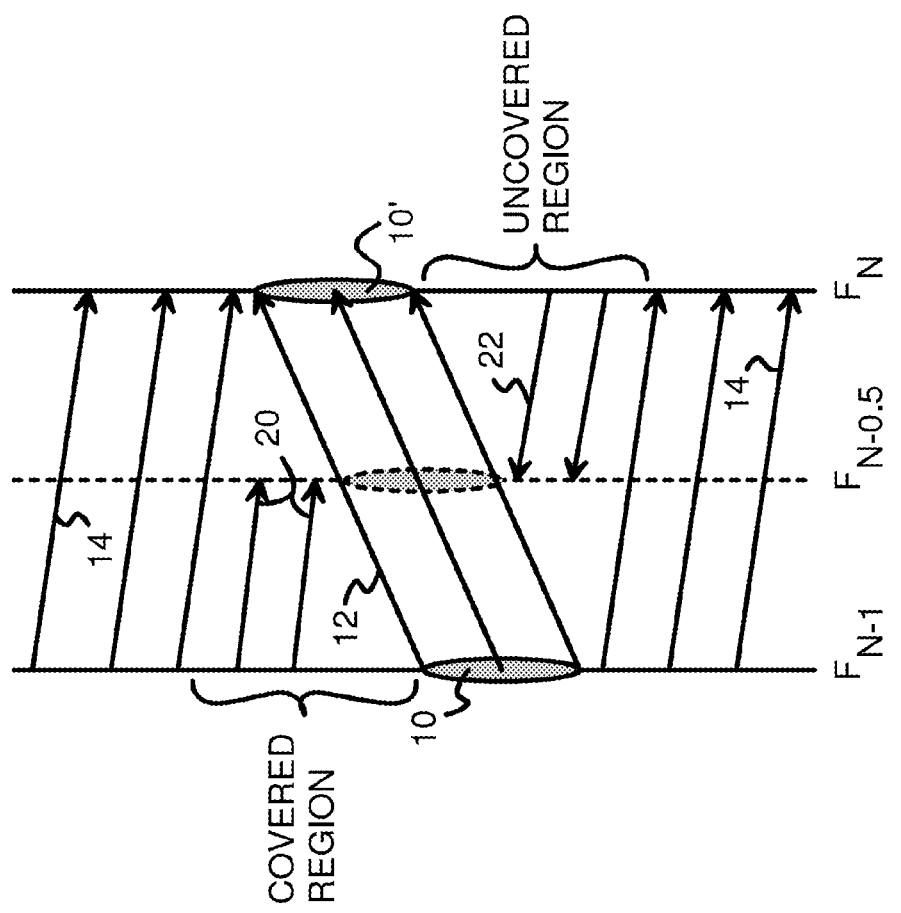
FIG. 4 shows motion vectors in covered and uncovered regions in an interpolated frame.

FIG. 4 shows motion vectors in covered and uncovered regions in an interpolated frame. Macroblocks in frame FN−1 are translated along trajectories of motion vectors 14 to locate these macroblocks within interpolated frame FN−0.5. Also, macroblocks in object 10 are translated along trajectories of object motion vectors 12 to place these macroblocks within interpolated frame FN−0.5.

Covered motion vectors 20 are assigned for macroblocks in interpolated frame FN−0.5 that have no corresponding macroblocks in frame FN, since object 10' has covered these macroblocks. The size of the covered region is larger in frame FN−1 than in frame FN−0.5, so covered motion vectors 20 point backwards to the macroblocks in frame FN−1 that best match.

Uncovered motion vectors 22 are assigned for macroblocks in interpolated frame FN−0.5 that have no corresponding macroblocks in frame FN−1, since object 10 covers these macroblocks. The size of the uncovered region is larger in frame FN than in frame FN−0.5, so uncovered motion vectors 22 point forwards to the macroblocks in frame FN that best match.

Halo reduction first detects the covered and uncovered regions, then assigns the correct motion vectors 20, 22 to these regions. The covered regions are constructed from the pixel data of the prior frame according to the assigned motion vectors, while the uncovered regions are constructed from the pixel data of the next frame according to the assigned motion vectors.

Figure 5:
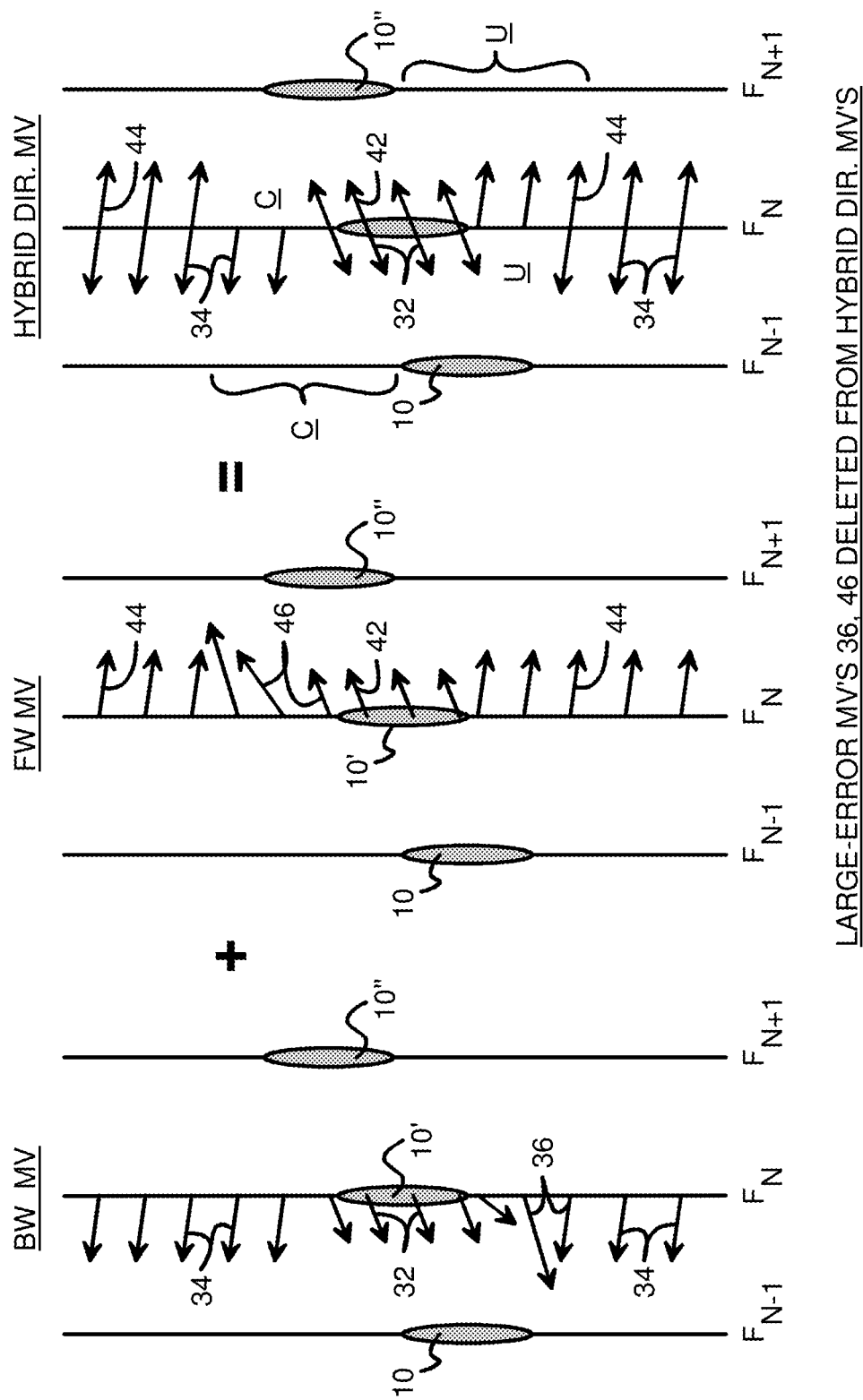
FIG. 5 illustrates creation of hybrid direction motion vectors.

FIG. 5 illustrates creation of hybrid direction motion vectors. Motion vectors are generated for each successive frame FN. Frame FN is divided into macroblocks. A backward motion vector is generated for each macroblock by searching for the block in frame FN−1 with the lowest error or mismatch to the current macroblock in frame FN, such as selecting a block with a minimum sum-of-the-absolute difference (SAD). Backward motion vectors 34 and 36 are for background macroblocks while backward motion vectors 32 are for object 10'.

A forward motion vector is generated for each macroblock by searching for the block in frame FN+1 with the lowest error or mismatch to the current macroblock in frame FN, such as selecting a block with a minimum sum-of-the-absolute difference (SAD). Forward motion vectors 44 and 46 are for background macroblocks while forward motion vectors 42 are for object 10'.

Hybrid direction motion vectors are generated for frame FN by selecting backward motion vectors 34 and forward motion vectors 44 for background macroblocks, and by selecting backward motion vectors 32 and forward motion vectors 42 for macroblocks within object 10'. Since there tend to be good block matching in both the backward and forward directions for background and object macroblocks, the forward and backward motion vectors tend to be co-linear and orderly.

Block matching is based on macroblocks from three original frames, FN−1, FN, and FN+1. Good block matching is generally achieved for background and objects, since there is little change in motion from one frame to the next frame.

However, macroblocks in frame FN near the edges of object 10' may be later covered in frame FN+1. These macroblocks in covered region C in frame FN have no matching block in frame FN+1. Thus any covered region motion vectors 46 generated tend to be disordered and have large matching errors, since any block match is a false match. The macroblock has no actual matching block in frame FN+1, since the macroblock is covered by object 10" in frame FN+1.

For covered region C, covered region motion vectors 46 have a high block error and MV discontinuity, since they are based on a false block match. Covered region forward motion vectors 46 are discarded and are not included in hybrid direction motion vectors for frame FN. Instead, only backward motion vectors 34 are included in the hybrid direction motion vectors for covered region C. Thus the hybrid direction motion vectors in covered region C are unidirectional, not bi-directional. The hybrid direction motion vectors for frame FN in covered region C has only backward motion vectors 34, and no forward motion vectors 44. Covered region motion vectors 46 have been deleted from the hybrid direction motion vectors.

Likewise, macroblocks in frame FN near the edges of object 10' may be covered in earlier frame FN−1. These macroblocks in uncovered region U in frame FN have no matching block in frame FN−1. Thus any uncovered region motion vectors 36 generated tend to have large matching errors and MV discontinuity, since any block match is a false match. The macroblock has no actual matching block in frame FN−1, since the macroblock is covered by object 10 in frame FN−1.

For uncovered region U, uncovered region backward motion vectors 36 are discarded and are not included in hybrid direction motion vectors for frame FN. Instead, only forward motion vectors 44 are included in the hybrid direction motion vectors for uncovered region U.

Thus the hybrid direction motion vectors in uncovered region U are unidirectional, not bi-directional. The hybrid direction motion vectors for frame FN in uncovered region U has only forward motion vectors 44, and no backward motion vectors 36.

The hybrid direction motion vectors are bi-directional for background and objects, but are unidirectional for covered and uncovered regions.

Figure 6:
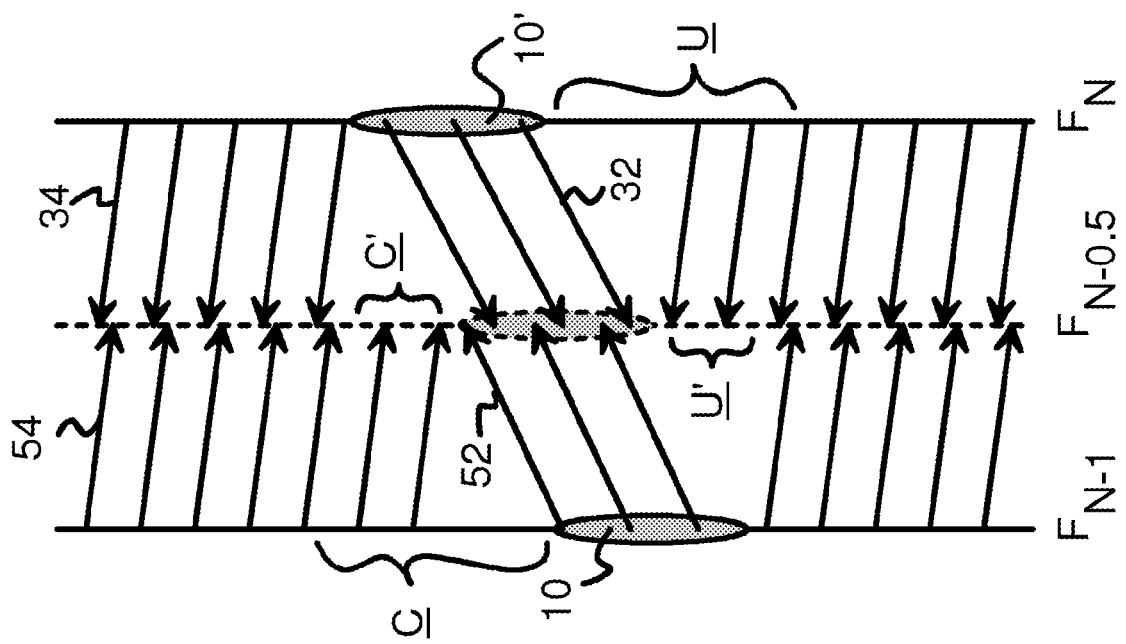
FIG. 6 shows detecting covered and uncovered regions using hybrid direction motion vectors.

FIG. 6 shows detecting covered and uncovered regions using hybrid direction motion vectors. The hybrid direction motion vectors for frames FN−1 and FN are used to detect covered and uncovered regions in the interpolated frame FN−0.5.

The motion paths or trajectories for each macroblock in prior frame FN−1 are described by the forward motion vectors within the hybrid direction motion vectors that are saved for frame FN−1. These paths intersect interpolated frame FN−0.5. Macroblocks in interpolated frame FN−0.5 that intersect one of these forward motion paths can be marked, such as by setting a forward-intersect bit.

Likewise, the motion paths or trajectories for each macroblock in frame FN are described by the backward motion vectors within the hybrid direction motion vectors that are saved for frame FN. These paths also intersect interpolated frame FN−0.5. Macroblocks in interpolated frame FN−0.5 that intersect one of these backward motion paths can be marked, such as by setting a backward-intersect bit.

Many macroblocks within interpolated frame FN−0.5 are intersection by both a forward motion path from frame FN−1 and by a backward motion path from frame FN. These macroblocks that are intersected by both forward and backward motion paths are neither covered nor uncovered.

Some macroblocks within interpolated frame FN−0.5 are intersection by only a forward motion path from frame FN−1, but are not intersected by any backward motion path from frame FN. These macroblocks that are intersected only by forward motion paths are in the covered region C. These macroblocks have their forward-intersect bit set but their backward-intersect bit cleared.

Other macroblocks within interpolated frame FN−0.5 are intersection by only a backward motion vector 34 path from frame FN, but are not intersected by any forward motion vector 54 path from frame FN−1. These macroblocks that are intersected only by backward motion paths are in the uncovered region U. These macroblocks have their backward-intersect bit set but their forward-intersect bit cleared.

FIG. 6 shows that covered region C' in interpolated frame FN−0.5 has only forward motion vectors 54 from frame FN−1 pointing to it, but does not have any backward motion vectors 32, 34 from frame FN pointing to it. Uncovered region U' in interpolated frame FN−0.5 has only backward motion vectors 34 from frame FN pointing to it, but does not have any forward motion vectors 52, 54 from frame FN−1 pointing to it.

A map may be generated for frame FN−0.5 of its covered and uncovered regions. The forward-intersect bits and backward-intersect bits may be used for this map. For example, macroblocks in interpolated frame FN−0.5 that are detected as covered regions can have a pair of flag bits set to 10, while macroblocks that are detected as being in uncovered regions have their flag bits set to 01. Regions that are not covered or uncovered have flag bits of 00 or 11, where the flag bits are the forward-intersect bit and the backward-intersect bit for a macroblock.

Occlusion detection is thus based on the hybrid direction motion vectors of the original frames. Occluded and disoccluded regions in the interpolated frame have only one of the hybrid direction motion vectors passing through, not both. Errors in occlusion detection are reduced since high-mismatch error motion vectors were deleted from the hybrid direction motion vectors that form the basis for occlusion detection.

Figure 7:
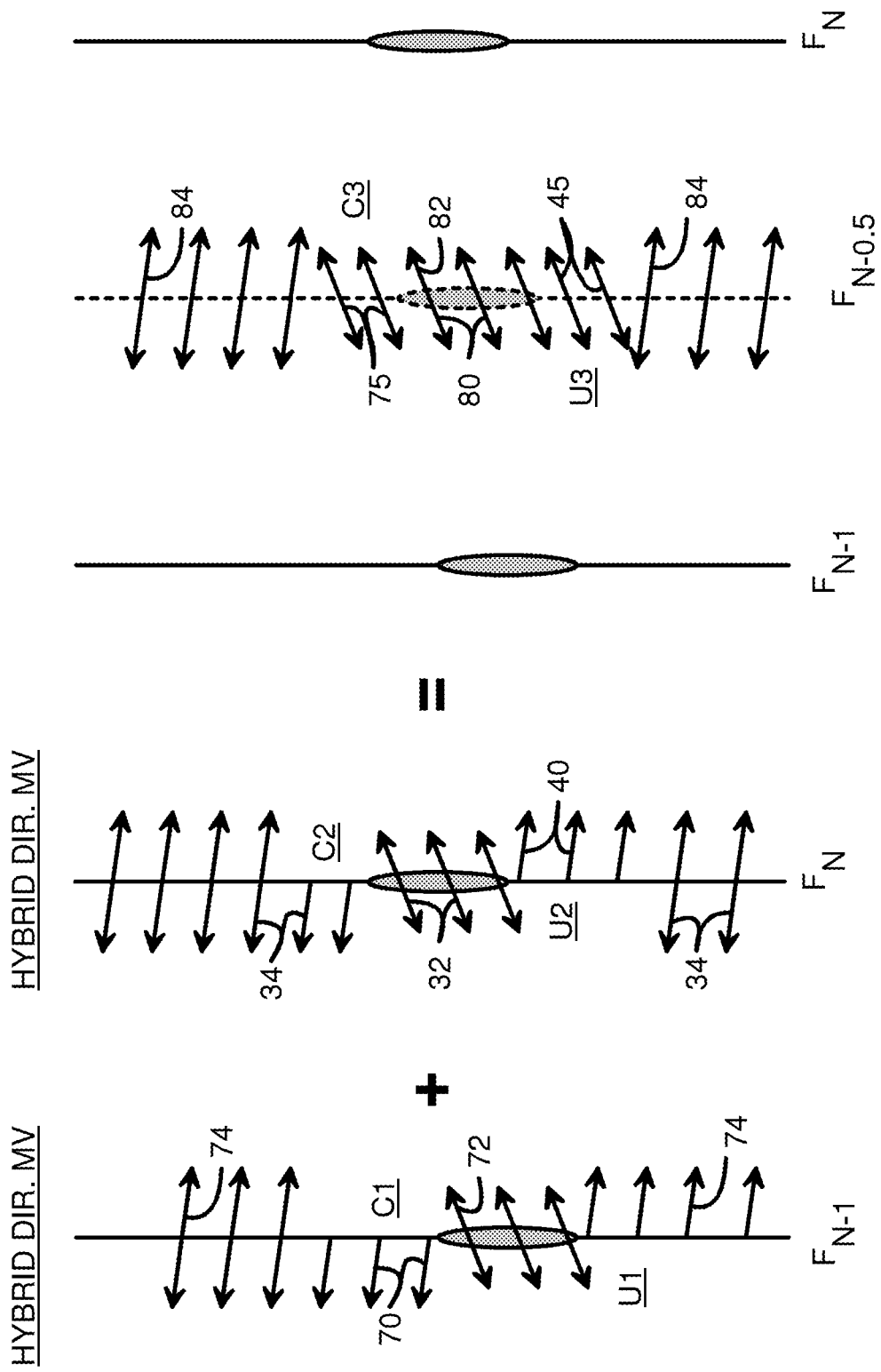
FIG. 7 shows refinement of motion vectors for the interpolated frame based on hybrid direction motion vectors for adjacent original frames.

FIG. 7 shows refinement of motion vectors for the interpolated frame based on hybrid direction motion vectors for adjacent original frames. The hybrid direction motion vectors generated for frames FN−1 and FN are used as the basis for the motion vectors for interpolated frame FN−0.5. Since interpolated frame FN−0.5 is between frames FN−1 and FN, the motion to interpolated frame FN−0.5 is smaller than the motion between original frames FN−1, FN, such as half of the original motion. Since frame FN−0.5 is adjacent to frame FN−1 and frame FN, and the motion field has temporal and spatial continuity through a video, the differences between motion vectors for frames FN−1, FN−0.5, and FN are small. So motion vectors for frame FN−0.5 can be generated by refining motion vectors for frame FN−1 and FN.

Interpolated frame FN−0.5, which doesn't yet exist, is divided into macroblocks, even though no pixels yet exist within these macroblocks. Hybrid direction motion vectors of frame FN−1 and FN are assigned to these macroblocks as initial motion vectors. The length of the motion vectors from frames FN and FN−1 is cut in half to create the motion vectors for frame FN−0.5. Since there is more than one initial motion vector for each macroblock and these motion vectors don't exactly fit the interpolated frame FN−0.5, MV refinement is needed.

Each macroblock in interpolated frame FN−0.5 examines the initial hybrid direction motion vectors of neighboring macroblocks as candidate motion vectors. For example, the hybrid motion vector for the corresponding block and its 8 neighboring blocks can be tested as candidates, for a total of 18 candidate motion vectors from frames FN, FN−1.

Since FN−0.5 doesn't exist, a bi-directional block matching method is used to evaluate these candidate motion vectors. The candidate hybrid motion vector from frame FN−1 or FN that is applied to the macroblock in frame FN−0.5 that has the smallest bi-directional matching error is selected as the motion vector for that macroblock.

Each candidate motion vector of the current macroblock in frame FN−0.5 is extended backward to fetch a block from frame FN−1 and forward to fetch a block from frame FN. The matching error (such as SAD) of the two fetched blocks is calculated. Note that the blocks fetched from frames FN, FN−1 may be offset by any number of pixels (determined by the motion vectors) and do not have to fit exactly along macroblock boundaries. The candidate motion vector that produces the smallest SAD is selected as motion vector of the current macroblock.

The motion vectors for interpolated frame FN−0.5 are all bi-directional motion vectors that point both forward and backward. Some background motion vectors 84 are selected from candidate motion vectors 34 in frame FN or motion vectors 74 in frame FN−1. Object motion vectors 82 are selected from candidate motion vectors 32 in frame FN or candidate motion vectors 72 in frame FN−1.

Since no candidate motion vectors are correct in the covered/uncovered regions (region C3 and U3), all neighboring candidate motion vectors could be selected as motion vectors 75 and 45. Object motion vectors (72 and 32) are selected as shown in FIG. 7, but that may not always happen. Which motion vectors are selected in these regions does not matter, since they are replaced in a later step.

After refinement, bi-directional faulty motion vectors 75 in covered region C3 are incorrect, since there are no corresponding matching blocks between frame FN−1 and FN. Also, bi-directional faulty motion vectors 45 in uncovered region U3 are incorrect, since there are no corresponding matching blocks between frame FN−1 and FN. Thus the bi-directional motion vectors for interpolated frame FN−0.5 are faulty in covered and uncovered regions near object boundaries.

Figure 8:
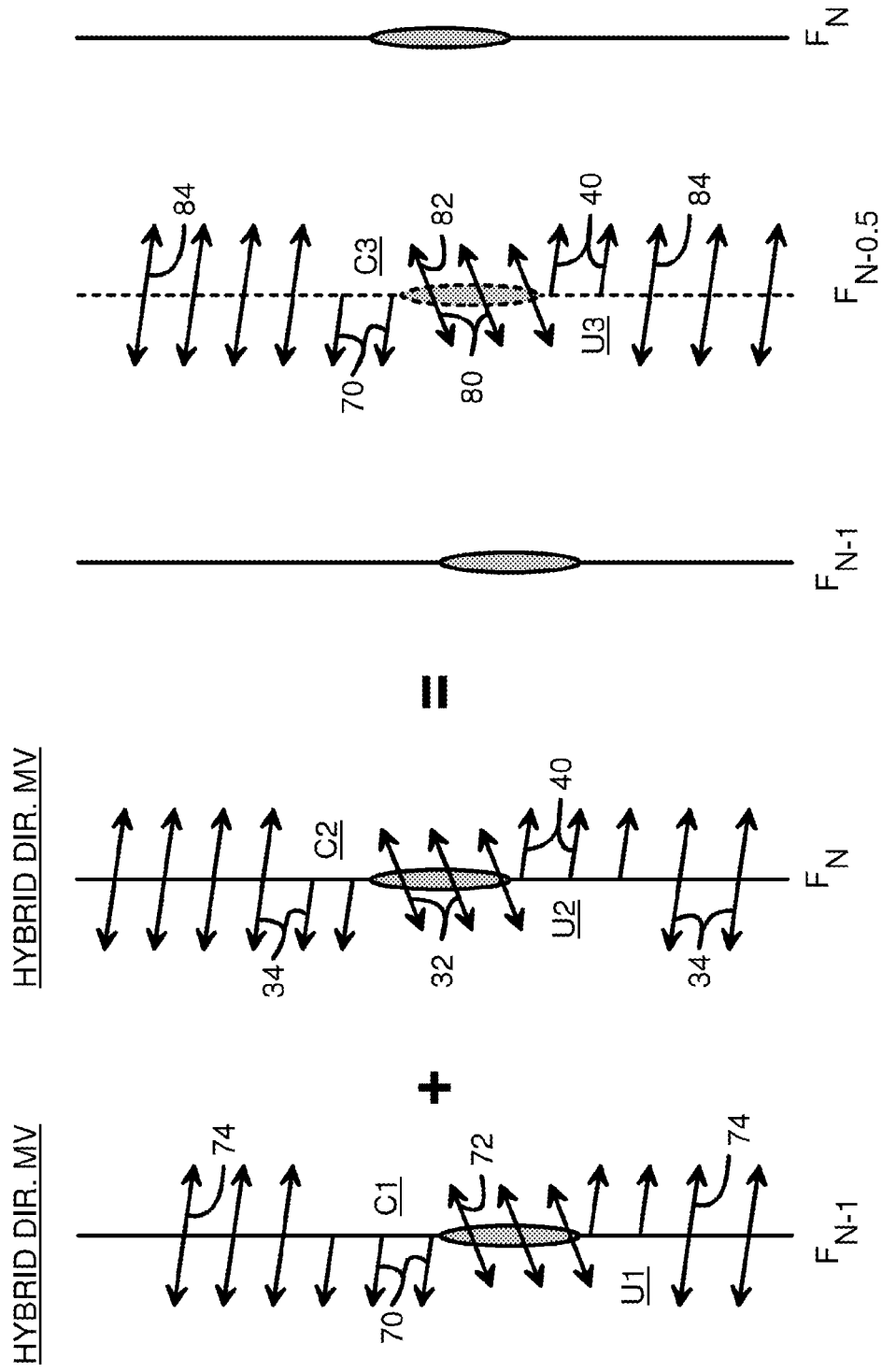
FIG. 8 shows assignment of hybrid direction motion vectors for covered and uncovered regions.

FIG. 8 shows assignment of hybrid direction motion vectors for covered and uncovered regions. Object motion vectors 82 and background motion vectors 84 are accurate, since they are not in occlusion regions. However, bi-directional faulty motion vectors 75 in covered region C3 and bi-directional faulty motion vectors 45 (FIG. 7) in uncovered region U3 are inaccurate.

The map of the covered and uncovered region generated in FIG. 6 is used to identify bi-directional faulty motion vectors 75 in covered region C3 and bi-directional faulty motion vectors 45 in uncovered region U3. All motion vectors for macroblocks in interpolated frame FN−0.5 in covered region C3 are deleted and replaced by the half-length of the hybrid direction motion vectors for these same macroblocks from frame FN−1. Thus bi-directional faulty motion vectors 75 in covered region C3 of frame FN−0.5 are replaced by the half-length of the covered-region hybrid motion vectors 70 from prior frame FN−1. The motion vectors are copied over to the interpolated frame in exactly the same block location as in frame FN or FN−1.

Likewise, all motion vectors for macroblocks in interpolated frame FN−0.5 in uncovered region U3 are deleted and replaced by the hybrid direction motion vectors for these same macroblocks from frame FN. Thus bi-directional faulty motion vectors 45 in uncovered region U3 of frame FN−0.5 are replaced by uncovered-region hybrid motion vectors 40 from frame FN.

Clear and accurate motion vectors are thus assigned to the covered region from the hybrid direction motion vectors of prior frame FN−1. Hybrid direction motion vectors from frame FN are assigned to replace bi-directional faulty motion vectors 45 in the uncovered region. Since the hybrid direction motion vectors were carefully generated with low mismatch errors (FIG. 5), and faulty motion vectors for covered and uncovered regions were removed, these hybrid direction motion vectors are very accurate. A high error tolerance is achieved.

Figure 9:
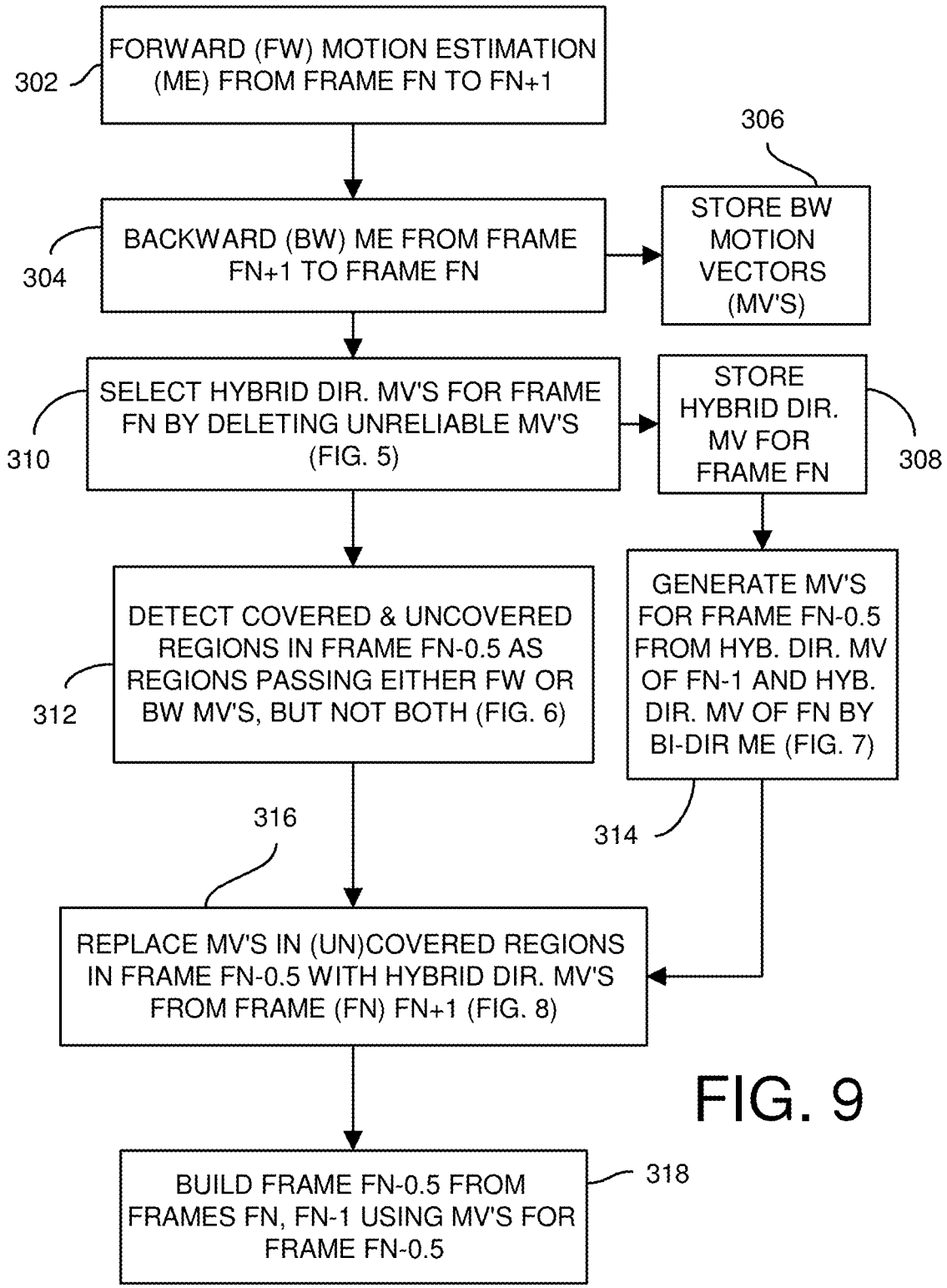
FIG. 9 is a flowchart of frame interpolation using hybrid direction motion vectors for occlusion detection.

FIG. 9 is a flowchart of frame interpolation using hybrid direction motion vectors for occlusion detection. The process steps through sequential frames, with frame FN becoming frame FN−1 in the next cycle, etc. Forward motion estimation is performed between frames FN and FN+1, step 302, to obtain the forward motion vectors for frame FN. Backward motion estimation is also performed between frames FN and FN+1, step 304, to obtain the backward motion vectors for frame FN+1. These steps 302, 304 may be performed in parallel or serially. The backward motion vectors for frame FN+1 are stored for later use, step 306. In the next frame cycle, these backward motion vectors for frame FN+1 are the backward motion vectors for frame FN, since frame FN+1 becomes frame FN.

The hybrid direction motion vectors for frame FN are generated by selecting from backward motion vectors and forward motion vectors for frame FN, step 310. This was shown earlier in FIG. 5. The block matching error information was obtained in step 302 and 304, so there is no need to perform block matching again. Motion vectors that are unreliable are deleted, such as for large block errors, motion vectors that are not continuous with neighboring motion vectors, or are not unique. Not unique means there are many MV's that cause a very small matching error; these motion vectors are unreliable because the current macroblock is featureless and it is uncertain which MV is correct. Thresholds may be set or adjusted for error, continuity (% change to neighboring macroblocks), and uniqueness (% difference between the minimum error and the second minimum error). The hybrid motion vectors are bi-directional, except near object boundaries, where unidirectional motion vectors remain after one direction of a bi-directional motion vector is deleted when unreliable. The hybrid direction motion vectors for frames FN are stored for later use, step 308. These are used in the next frame cycle when frame FN becomes frame FN−1.

The interpolated motion vectors for the interpolated frame FN−0.5 are generated by refinement from the hybrid direction motion vectors for frames FN−1, FN, step 314. Bi-directional motion estimation is used to select hybrid direction motion vectors from frames FN, FN−1 for nearby macroblocks.

In step 314, each candidate hybrid motion vector from frame FN or FN−1 is halved and moved to the macroblock location being tested in frame FN−0.5, then the halved motion vector is extended forward to fetch a block from frame FN and extended backward to fetch a block from frame FN−1. The matching error (SAD) between these two blocks is then evaluated. The candidate motion vector that fetches two blocks with the lowest matching error is selected as the motion vector for the macroblock location being tested.

This step 314 was shown in FIG. 7. After refinement, the motion vectors for interpolated frame FN−0.5 have faulty motion vectors in covered and uncovered regions.

The covered and uncovered regions are detected in step 312, also shown in FIG. 6. Macroblocks in interpolated frame FN−0.5 that intersect only a trajectory from a forward portion of a hybrid direction motion vector from frame FN−1, but do not intersect a trajectory for a backward portion of any hybrid direction motion vectors from frame FN, are detected to be in the covered region.

Macroblocks in interpolated frame FN−0.5 that intersect only a trajectory from a backward portion of a hybrid direction motion vector from frame FN, but do not intersect a trajectory for a forward portion of any hybrid direction motion vectors from frame FN−1, are detected to be in the uncovered region.

Once the covered and uncovered regions are detected in step 312, motion vectors in these regions are replaced. Hybrid direction motion vectors from frame FN−1 are reduced by half and then assigned to replace the faulty motion vectors in the covered regions, while hybrid direction motion vectors from frame FN are reduced by half and then replace the faulty motion vectors in the uncovered regions. All motion vectors in the covered and uncovered regions detected in step 312 are considered faulty and are replaced in assignment step 316, which is shown in FIG. 8.

The interpolated frame may then be generated using the motion vectors for interpolated frame FN−0.5, step 318. The graphics data for each macroblock is fetched from either original frame FN or FN−1 using the motion vectors for interpolated frame FN−0.5 to locate the correct macroblocks in original frames FN, FN−1.

Figure 10:
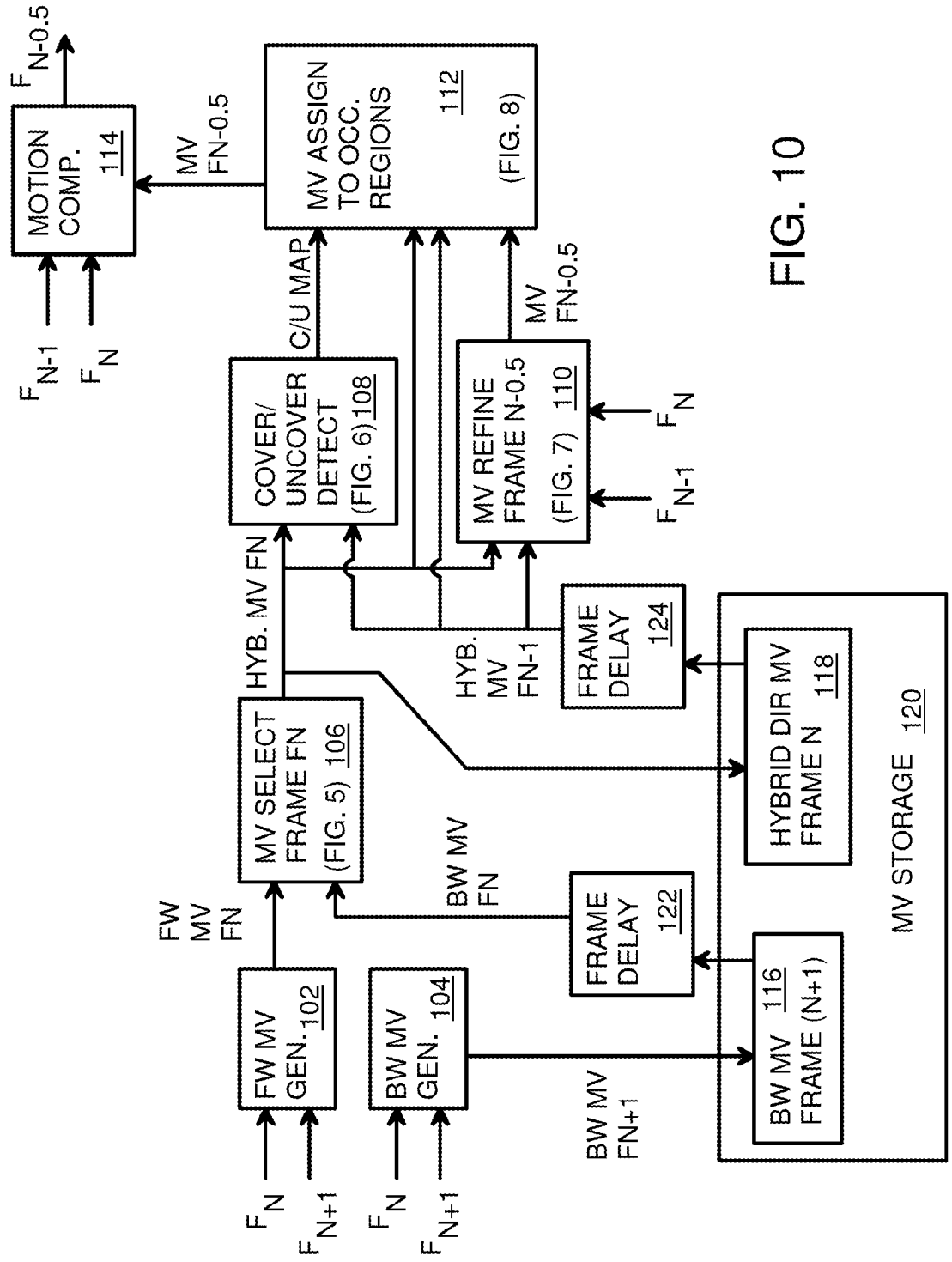
FIG. 10 is a block diagram of a frame interpolator that uses hybrid direction motion vectors for occlusion detection and MV assignment to occlusion regions.

FIG. 10 is a block diagram of a frame interpolator that uses hybrid direction motion vectors for occlusion detection and MV assignment to occlusion regions. Forward motion estimation is performed between frames FN and FN+1 by forward motion estimator 102 to obtain the forward motion vectors for frame FN, FW_MV_FN. Backward motion estimation is performed between frames FN and FN+1 by backward motion estimator 104 to obtain the backward motion vectors for frame FN+1, BW_MV_FN+1.

The backward motion vectors for frame FN+1 are stored in storage 120 for later use, as frame FN+1 backward motion vectors 116. In the next frame cycle, after frame delay 122, these backward motion vectors for frame FN+1 become the backward motion vectors for frame FN, BW_MV_FN, since frame FN+1 becomes frame FN. Frame delay 122, 124 can be registers that are clocked by a frame clock.

Hybrid selector 106 uses FW_MV_FN and BW_MV_FN to generate the hybrid direction motion vectors for frame FN. This was shown earlier in FIG. 5. Motion vectors that are unreliable are deleted, such as for large block errors, motion vectors that are not continuous with neighboring motion vectors, or are not unique. The hybrid direction motion vectors for frame FN, HYB_MV_FN, are stored in storage 120 for later use, as frame FN hybrid direction motion vectors 118. In the next frame cycle, after frame delay 124, these motion vectors become the hybrid direction motion vectors for frame FN−1, HYB_MV_FN−1.

The hybrid direction motion vectors for frame FN and for frame FN−1 are input to covered-region detector 108, motion vector refiner 110, and motion vector assignor 112.

Motion vector refiner 110 refines the hybrid direction motion vectors for original frames FN, FN−1 to generate the interpolated motion vectors for the interpolated frame FN−0.5. Bi-directional motion estimation is used to select hybrid direction motion vectors from frames FN, FN−1 for nearby macroblocks. This step was shown in FIG. 7. After refinement, the motion vectors for interpolated frame FN−0.5, MV_FN−0.5 have faulty motion vectors in covered and uncovered regions.

The covered and uncovered regions are detected by covered-region detector 108. This process was shown in FIG. 6. Macroblocks in interpolated frame FN−0.5 that intersect only a trajectory from a forward portion of a hybrid direction motion vector from frame FN−1, but do not intersect a trajectory for a backward portion of any hybrid direction motion vectors from frame FN, are detected to be in the covered region. Macroblocks in interpolated frame FN−0.5 that intersect only a trajectory from a backward portion of a hybrid direction motion vector from frame FN, but do not intersect a trajectory for a forward portion of any hybrid direction motion vectors from frame FN−1, are detected to be in the uncovered region. A map (C/U MAP) of the covered and uncovered regions in interpolated frame FN−0.5 is created by covered-region detector 108 and sent to motion vector assignor 112.

Once the covered and uncovered regions are detected by covered-region detector 108, motion vectors in these regions are replaced by motion vector assignor 112 using the covered/uncovered region map. A half-length of the hybrid direction motion vectors from frame FN−1 are assigned to replace the faulty motion vectors in the covered regions, while a half-length of the hybrid direction motion vectors from frame FN replace the faulty motion vectors in the uncovered regions. All motion vectors in the covered and uncovered regions detected by covered-region detector 108 and show in the C/U map are considered faulty and are replaced by motion vector refiner 110, as shown in FIG. 8.

The interpolated frame may then be generated by motion compensator 114 using the motion vectors for interpolated frame FN−0.5 that were corrected by motion vector assignor 112. The graphics data for each macroblock is fetched from either original frame FN or FN−1 (or both) using the motion vectors for interpolated frame FN−0.5 to locate the correct macroblocks in original frames FN, FN−1. Normal macroblocks are constructed from both macroblocks from FN−1 and FN. Covered macroblocks are constructed with macroblocks from FN−1, while uncovered macroblocks are constructed with macroblocks from FN.

Figure 11:
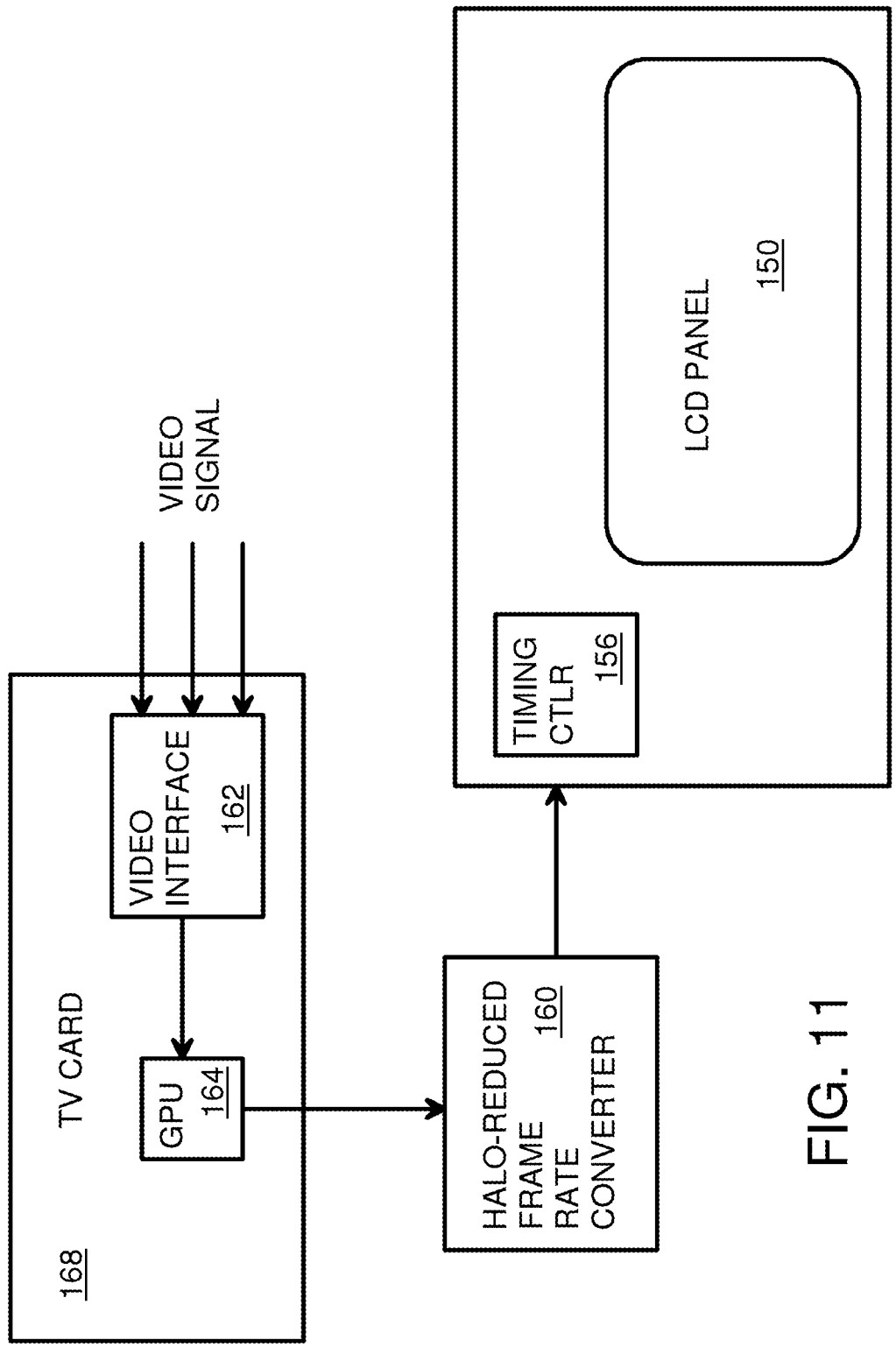
FIG. 11 shows an application that uses the halo-reduced frame rate converter.

FIG. 11 shows an application that uses the halo reduced frame rate converter. Hybrid-direction frame rate converter 160 is shown in FIG. 10, but also includes muxing or selecting logic to insert interpolated frame FN−0.5 between original frames FN−1, FN to generate a sequence of frames at a higher frame rate than the original sequence.

A video signal is input to video interface 162, which receives the physical signals and generates digital signals that may be buffered to graphics processor 164. graphics processor 164 on TV card 168 generates a sequence of original frames FN−1, FN, FN+1 that represent the video input.

Hybrid-direction frame rate converter 160 intercepts the original frame sequence and inserts interpolated frames to generate a sequence with a higher frame rate that is applied to timing controller 156, which causes liquid crystal display (LCD) panel 150 to display pixels. LCD panel 150 may have a higher refresh or frame rate than that of the video signal applied to TC card 168.

Alternate Embodiments

Several other embodiments are contemplated by the inventors. For example the video frames may be encoded using standards such as motion-picture-experts group (MPEG) or other compression standards, or proprietary formats, or various combinations. The methods may also be applied to content-retrieval applications using standards such as H.26L. Macroblock matching can compare differences in all color components such as YUV or RGB, or can just compare one or two components such as luminance Y.

While the frame rate was doubled in the examples shown, other conversion ratios could be substituted, such as three interpolated frames inserted for 2 original frames, one interpolated frame inserted for every 3 frames, or two interpolated frames inserted for every five original frames, etc. The invention may be applied to slow-motion or stop-action features, and the video sequence may include any ratio of original frames and interpolated frames. The invention may also be applied to conversion among video standards, blur reduction, and similar applications.

While sum-of-the-absolute difference (SAD) has been described as a method to evaluate block matching errors, other evaluation methods may be used, such as Mean-Square-Error (MSE), Mean-Absolute-Difference (MAD), Sum-of-Squared Errors, etc. Rather than block matching for motion estimation, phase correlation or other frequency domain methods may be substituted. Rather than use macroblocks, smaller blocks may be used, especially around object boundaries, or larger blocks could be used for background or objects. Regions that are not block shaped may also be operated upon. Different cost functions could be used.

The size of the macroblock may be 8×8, 16×16, or some other number of pixels. While macroblocks such as 16×16 blocks and 8×8 have been described, other block sizes can be substitutes, such as larger 32×32 blocks, 16×8 blocks, smaller 4×4 blocks, etc. Non-square blocks can be used, and other shapes of regions such as triangles, circles, ellipses, hexagons, etc., can be used as the region or "block". Adaptive blocks need not be restricted to a predetermined geometrical shape. For example, the sub-blocks could correspond to content-dependent sub-objects within the object. Smaller block sizes can be used for very small objects for motion estimation and generating average motion.

The size, format, and type of pixels may vary, such as RGB, YUV, 8-bit, 16-bit, or may include other effects such as texture or blinking. The search range during motion estimation may be fixed or variable, and may have an increment of one pixel in each direction, or may increment in 2 or more pixels or may have directional biases. Adaptive routines may also be used. Larger block sizes may be used in some regions, while smaller block sizes are used near object boundaries or in regions with a high level of detail.

Different search ranges and methods can be used when searching for the best-matching macroblock. For example, a diamond-shaped search pattern or a 3-point pattern may be more efficient than exhaustively searching a square region. Different search strategies can be used to further speed up the computation.

Various combinations of hardware, programmable processors, and firmware may be used to implement functions and blocks. Pipelining may be used, as may parallel processing. Various routines and methods may be used for motion estimation, motion compensation, and factors such as the search range for motion estimation may also vary.

The direction of the video sequence could be reversed, and forward motion estimation could be substituted for backward motion estimation. Some frames may be forward estimated while others backward estimated. Frames that do not have motion vectors already generated could be skipped when the interpolation is performed, or when a compressed video sequence is used as the input.

It is not necessary to fully process all macroblocks in each frame. For example, only a subset or limited area of each frame could be processed. It may be known in advance that the object only appears in a certain area of the frame, such as a moving car only appearing on the right side of a frame captured by a camera that has a highway on the right but a building on the left. The "frame" may be only a subset of the still image captured by a camera or stored or transmitted.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A halo-reducing frame rate converter comprising:
   a forward motion vector generator, receiving a current frame of graphics data and a next frame of graphics data, and generating forward motion vectors for the current frame, the forward motion vectors each pointing to a best-matching block in the next frame;
   a backward motion vector generator, receiving the current frame of graphics data and generating backward motion vectors, the backward motion vectors each pointing to a best matching block in an earlier frame in a sequence of frames;
   wherein the forward motion vectors each have a block-matching error to the best-matching block in the next frame;
   wherein the backward motion vectors each have a block-matching error to the best-matching block in the earlier frame;
   a hybrid direction motion vector generator, receiving the forward motion vectors for the current frame, and receiving backward motion vectors for the current frame, the hybrid direction motion vector generator generating hybrid direction motion vectors for the current frame that include the forward motion vectors and the backward motion vectors, wherein forward motion vectors having block-matching errors above a threshold are deleted from the hybrid direction motion vectors for the current frame, wherein backward motion vectors having block-matching errors above the threshold are deleted from the hybrid direction motion vectors for the current frame;
   a covered region detector that projects a forward trajectory for each forward motion vector in the hybrid direction motion vectors for a prior frame, and that projects a backward trajectory for each backward motion vector in the hybrid direction motion vectors for the current frame, the covered region detector indicating a covered region in an interpolated frame between the prior frame and the current frame, wherein the covered region has at least one forward trajectory but not any backward trajectory intersecting the covered region;
   an interpolated motion vector refiner, that generates refined motion vectors for the interpolated frame by bi-directional motion estimation using the hybrid direction motion vectors for the prior frame and for the current frame;
   wherein the refined motion vectors include faulty motion vectors in the covered region;
   a motion vector corrector that assigns hybrid direction motion vectors from the prior frame to replace the faulty motion vectors in the covered region detected by the covered region detector to generate corrected motion vectors for the interpolated frame, wherein the faulty refined motion vectors have no valid block matches in the prior frame;

wherein the motion vector corrector deletes the faulty refined motion vectors;

whereby faulty motion vectors in the covered region are deleted and replaced by hybrid direction motion vectors from an original frame after the covered region is detected by intersection of least one forward trajectory but not any backward trajectory.

2. The halo-reducing frame rate converter of claim 1 wherein the interpolated motion vector refiner generates the refined motion vectors for the interpolated frame by halving the hybrid direction motion vectors for the prior frame and for the current frame;

wherein the motion vector corrector assigns half-magnitude hybrid direction motion vectors from the prior frame to replace the faulty motion vectors in the covered region, whereby interpolated motion vectors are half of a magnitude of the hybrid direction motion vectors.

3. The halo-reducing frame rate converter of claim 2 wherein the hybrid direction motion vector generator deletes motion vectors having block-matching errors above the threshold, motion vectors that are not continuous with neighboring motion vectors, motion vectors in featureless regions that are not unique.

4. The halo-reducing frame rate converter of claim 3 wherein the threshold is adjusted to delete motion vectors for error, continuity, and uniqueness wherein continuity is evaluated as a percentage change to neighboring blocks, and uniqueness is evaluated as a percent difference between a minimum error and a second minimum error.

5. The halo-reducing frame rate converter of claim 2 wherein the backward motion vectors are generated in a prior cycle of a frame clock from the current frame and the next frame in the prior cycle;

wherein the backward motion vector generator receives the current frame of graphics data and the next frame of graphics data, and generates backward motion vectors for the next frame, the backward motion vectors each pointing from the next frame to a best matching block in the current frame;

a motion vector storage that stores the backward motion vectors generated in the prior cycle, to input to the hybrid direction motion vector generator in a current cycle of the frame clock, whereby generation of backward motion vectors is pipelined.

6. The halo-reducing frame rate converter of claim 5 wherein the motion vector storage also stores the hybrid direction motion vectors generated by the hybrid direction motion vector generator in the prior cycle, to input to the covered region detector and to the interpolated motion vector refiner in the current cycle of the frame clock as the hybrid direction motion vectors for the prior frame, whereby the hybrid direction motion vectors for the current frame are stored for use in the next frame clock cycle as the hybrid direction motion vectors for the prior frame.

7. The halo-reducing frame rate converter of claim 6 wherein the covered region detector also detects an uncovered region, wherein the uncovered region has at least one backward trajectory but not any forward trajectory intersecting the uncovered region.

8. The halo-reducing frame rate converter of claim 7 wherein the covered region detector sets a first bit for each block that has a forward trajectory passing through a block location in the interpolated frame;

wherein the covered region detector sets a second bit for each block that has a backward trajectory passing through the block location in the interpolated frame;

wherein the covered region detector identifies the covered region as including blocks with the first bit set but the second bit is not set;

wherein the covered region detector identifies the uncovered region as including blocks with the second bit set but the first bit is not set.

9. The halo-reducing frame rate converter of claim 8 wherein the covered region detector outputs a covered region map to the motion vector corrector.

10. The halo-reducing frame rate converter of claim 9 wherein the motion vector corrector also assigns hybrid direction motion vectors from the current frame to replace faulty motion vectors in the uncovered region detected by the covered region detector to generate corrected motion vectors for the interpolated frame.

11. The halo-reducing frame rate converter of claim 2 further comprising:

a motion compensator, receiving the corrected motion vectors, for generating the interpolated frame by using the corrected motion vectors to translate macroblocks from the prior frame to the interpolated frame, and by using the corrected motion vectors to translate macroblocks from the current frame to the interpolated frame.

12. The halo-reducing frame rate converter of claim 1 wherein the graphics data is encoded as motion-picture-experts group (MPEG) data.

13. A method for reducing halo artifacts when interpolating video frames comprising:

generating forward motion vectors for a current frame using motion estimation from the current frame to a next frame in a series of frames of encoded video;

generating backward motion vectors for the current frame using motion estimation from the current frame back to a prior frame;

generating hybrid direction motion vectors for the current frame by including the forward motion vectors for the current frame that have errors that are less than an error threshold, and by including the backward motion vectors for the current frame that have errors that are less than the error threshold;

wherein an interpolated frame is between the prior frame and the current frame, the interpolated frame having no video data in an original video that includes the prior frame, the current frame, and the next frame;

detecting covered regions by projecting hybrid direction motion vectors that point forward from the prior frame to intersect the interpolated frame at first points, and by projecting hybrid direction motion vectors that point backward from the current frame to intersect the interpolated frame at second points, and by identifying covered regions as blocks having first points but not having any second points;

refining hybrid direction motion vectors for the prior frame and for the current frame to generate refined motion vectors for the interpolated frame;

replacing the refined motion vectors for blocks in the covered regions with hybrid direction motion vectors for corresponding blocks from the prior frame to generate corrected motion vectors for the interpolated frame; and using the corrected motion vectors for the interpolated frame to fetch blocks from the prior frame and from the current frame to generate blocks of video data for the interpolated frame, whereby covered regions are assigned motion vectors from original frames while other regions use refined motion vectors;

wherein refining hybrid direction motion vectors further comprises generating faulty refined motion vectors for the covered regions, the faulty refined motion vectors having no valid block matches in the prior frame;

wherein replacing the refined motion vectors for blocks in the covered regions with hybrid direction motion vectors comprises deleting the faulty refined motion vectors and replacing with the hybrid direction motion vectors for the corresponding blocks from the prior frame, whereby faulty refined motion vectors are generated and deleted.

14. The method of claim 13 wherein refining hybrid direction motion vectors for the prior frame and for the current frame to generate refined motion vectors for the interpolated frame further comprises:

bi-directional motion estimation using the hybrid direction motion vectors for the prior frame and for the current frame, whereby refined motion vectors are generated by bi-directional motion estimation.

15. A method for reducing halo artifacts when interpolating video frames comprising:

generating forward motion vectors for a current frame using motion estimation from the current frame to a next frame in a series of frames of encoded video;

generating backward motion vectors for the current frame using motion estimation from the current frame back to a prior frame;

generating hybrid direction motion vectors for the current frame by including the forward motion vectors for the current frame that have errors that are less than an error threshold, and by including the backward motion vectors for the current frame that have errors that are less than the error threshold;

wherein an interpolated frame is between the prior frame and the current frame, the interpolated frame having no video data in an original video that includes the prior frame, the current frame, and the next frame;

detecting covered regions by projecting hybrid direction motion vectors that point forward from the prior frame to intersect the interpolated frame at first points, and by projecting hybrid direction motion vectors that point backward from the current frame to intersect the interpolated frame at second points, and by identifying covered regions as blocks having first points but not having any second points;

refining hybrid direction motion vectors for the prior frame and for the current frame to generate refined motion vectors for the interpolated frame;

replacing the refined motion vectors for blocks in the covered regions with hybrid direction motion vectors for corresponding blocks from the prior frame to generate corrected motion vectors for the interpolated frame; and using the corrected motion vectors for the interpolated frame to fetch blocks from the prior frame and from the current frame to generate blocks of video data for the interpolated frame, whereby covered regions are assigned motion vectors from original frames while other regions use refined motion vectors;

wherein refining hybrid direction motion vectors for the prior frame and for the current frame to generate refined motion vectors for the interpolated frame further comprises:

for each block location in the interpolated frame, identifying candidate motion vectors that are adjacent to the block location in the prior frame and in the current frame;

generating a block error for each candidate motion vector by translating the candidate motion vector to the block location in the interpolated frame, and projecting the candidate motion vector forward to fetch a first block from the current frame, and projecting the candidate motion vector backward to fetch a second block from the prior frame, and generating an error value between the first block and the second block;

selecting as a refined motion vector for the block location a candidate motion vector having a lowest error value.

16. The method of claim 15 wherein generating the block error comprises generating a sum-of-the-absolute difference (SAD) of the first block and the second block, whereby refined motion vectors for the interpolated frame have minimized sum-of-the-absolute differences of adjacent blocks.

17. A method for reducing halo artifacts when interpolating video frames comprising:

generating forward motion vectors for a current frame using motion estimation from the current frame to a next frame in a series of frames of encoded video;

generating backward motion vectors for the current frame using motion estimation from the current frame back to a prior frame;

generating hybrid direction motion vectors for the current frame by including the forward motion vectors for the current frame that have errors that are less than an error threshold, and by including the backward motion vectors for the current frame that have errors that are less than the error threshold;

wherein an interpolated frame is between the prior frame and the current frame, the interpolated frame having no video data in an original video that includes the prior frame, the current frame, and the next frame;

detecting covered regions by projecting hybrid direction motion vectors that point forward from the prior frame to intersect the interpolated frame at first points, and by projecting hybrid direction motion vectors that point backward from the current frame to intersect the interpolated frame at second points, and by identifying covered regions as blocks having first points but not having any second points;

refining hybrid direction motion vectors for the prior frame and for the current frame to generate refined motion vectors for the interpolated frame;

replacing the refined motion vectors for blocks in the covered regions with hybrid direction motion vectors for corresponding blocks from the prior frame to generate corrected motion vectors for the interpolated frame; and using the corrected motion vectors for the interpolated frame to fetch blocks from the prior frame and from the current frame to generate blocks of video data for the interpolated frame, whereby covered regions are assigned motion vectors from original frames while other regions use refined motion vectors;

wherein generating the hybrid direction motion vectors comprises deleting motion vectors having block-matching errors above a block-matching threshold, and deleting motion vectors that have a difference with adjacent motion vectors that is above a vector-continuity threshold.

18. The method of claim 17 wherein the hybrid direction motion vectors include bi-directional motion vectors for moving objects and background regions, and uni-directional motion vectors for covered and uncovered regions along edges of the moving objects.

19. The method of claim 17 wherein the series of frames of encoded video are encoded as motion-picture-experts group (MPEG) data.

20. A frame interpolator comprising:
forward motion estimating means for generating forward motion vectors for a current frame using motion estimation from the current frame to a next frame in a series of frames of encoded video;
backward motion estimating means for generating backward motion vectors for the current frame using motion estimation from the current frame back to a prior frame;
hybrid direction motion vector generating means for generating hybrid direction motion vectors for the current frame by including the forward motion vectors for the current frame that have errors that are less than an error threshold, and by including the backward motion vectors for the current frame that have errors that are less than the error threshold;
wherein an interpolated frame is between the prior frame and the current frame, the interpolated frame having no video data in an original video that includes the prior frame, the current frame, and the next frame;
covered region detect means for detecting covered regions by projecting hybrid direction motion vectors that point forward from the prior frame to intersect the interpolated frame at first points, and by projecting hybrid direction motion vectors that point backward from the current frame to intersect the interpolated frame at second points, and by identifying covered regions as blocks having first points but not having any second points;
refine means for refining hybrid direction motion vectors for the prior frame and for the current frame to generate refined motion vectors for the interpolated frame;
assignment means for replacing the refined motion vectors for blocks in the covered regions with hybrid direction motion vectors for corresponding blocks from the prior frame to generate corrected motion vectors for the interpolated frame; and
motion compensate means for using the corrected motion vectors for the interpolated frame to fetch blocks from the prior frame and from the current frame to generate blocks of video data for the interpolated frame,
deletion means for deleting motion vectors having block-matching errors above a block-matching threshold, and for deleting motion vectors that have a difference with adjacent motion vectors that is above a vector-continuity threshold,
whereby covered regions are assigned motion vectors from original frames while other regions use refined motion vectors.

21. The frame interpolator of claim 20 wherein refine means further comprises:
bi-directional motion estimation means for finding a refined motion vector having a best match to blocks along a bi-directional trajectory using the hybrid direction motion vectors for the prior frame and for the current frame,
whereby refined motion vectors are generated by bi-directional motion estimation.

22. The frame interpolator of claim 20 wherein backward motion estimating means for generating backward motion vectors for the current frame using motion estimation from the current frame back to a prior frame further comprises:
pipelined backward motion estimating means for generating pipelined backward motion vectors for the next frame using motion estimation from the next frame back to the current frame;
storing the pipelined backward motion vectors for one frame period to generate the backward motion vectors for the current frame using motion estimation from the current frame back to a prior frame further,
whereby backward motion estimation is pipelined.

* * * * *